United States Patent [19]
Barlow

[11] 3,936,018
[45] Feb. 3, 1976

[54] JETTISONABLE AGRICULTURAL SPRAYER
[75] Inventor: Conrad R. Barlow, Redondo Beach, Calif.
[73] Assignee: Transland, Inc., Harbor City, Calif.
[22] Filed: Aug. 8, 1974
[21] Appl. No.: 495,588

[52] U.S. Cl............................ 244/136; 239/171
[51] Int. Cl.² .................................... B64D 1/18
[58] Field of Search......... 244/136, 137 R; 239/171; 169/53

[56] References Cited
UNITED STATES PATENTS

| | | | |
|---|---|---|---|
| 2,043,262 | 6/1936 | Oglesby et al. | 244/136 |
| 3,008,376 | 11/1961 | Brunow et al. | 244/137 R X |
| 3,220,482 | 11/1965 | Eveleth | 244/136 X |
| 3,428,276 | 2/1969 | Hubbard | 244/136 |
| 3,463,398 | 12/1970 | Smith et al. | 239/171 |
| 3,682,418 | 8/1972 | Harter | 244/136 |

FOREIGN PATENTS OR APPLICATIONS

| | | | |
|---|---|---|---|
| 1,469,662 | 2/1967 | France | 244/136 |

OTHER PUBLICATIONS

Arcadia Equipment Development Center, "Improved Fire Hose Dispensing Tray for Helicopters", Report No. 44, Nov., 1956.

*Primary Examiner*—Trygve M. Blix
*Assistant Examiner*—Galen L. Barefoot
*Attorney, Agent, or Firm*—Gordon L. Peterson

[57] ABSTRACT

A spraying apparatus adapted for connection to a helicopter and including a tank for containing the fluid to be sprayed, a spray boom coupled to the tank, and a pump for pumping the fluid from the tank to the spray boom. The tank is releasably coupled to the aircraft. At least one boom support is coupled to the spray boom. The boom support is also releasably connected to the aircraft. The tank and the spray boom are readily releasable from the aircraft and are maintained in a substantially fixed orientation relative to the aircraft.

10 Claims, 5 Drawing Figures

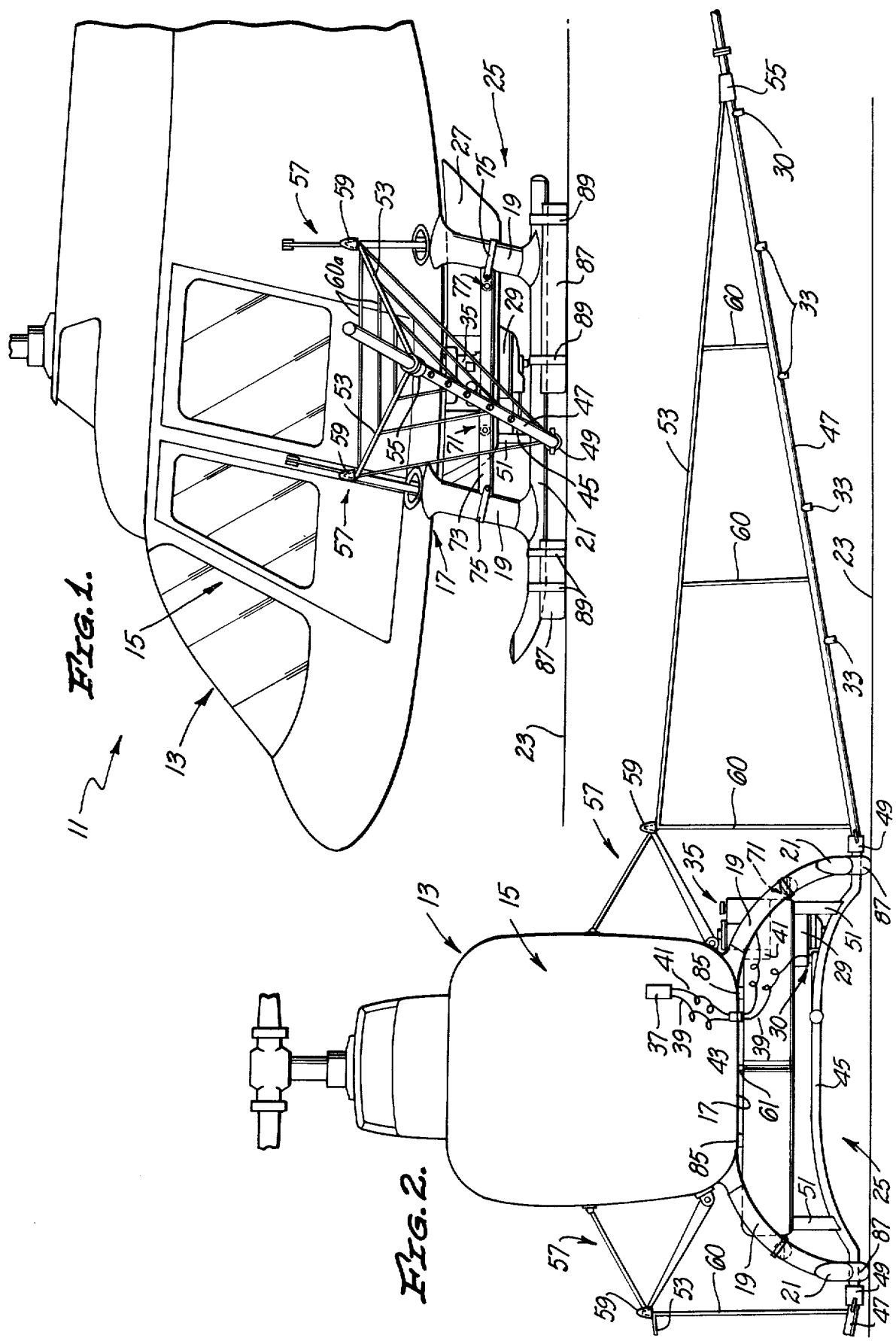

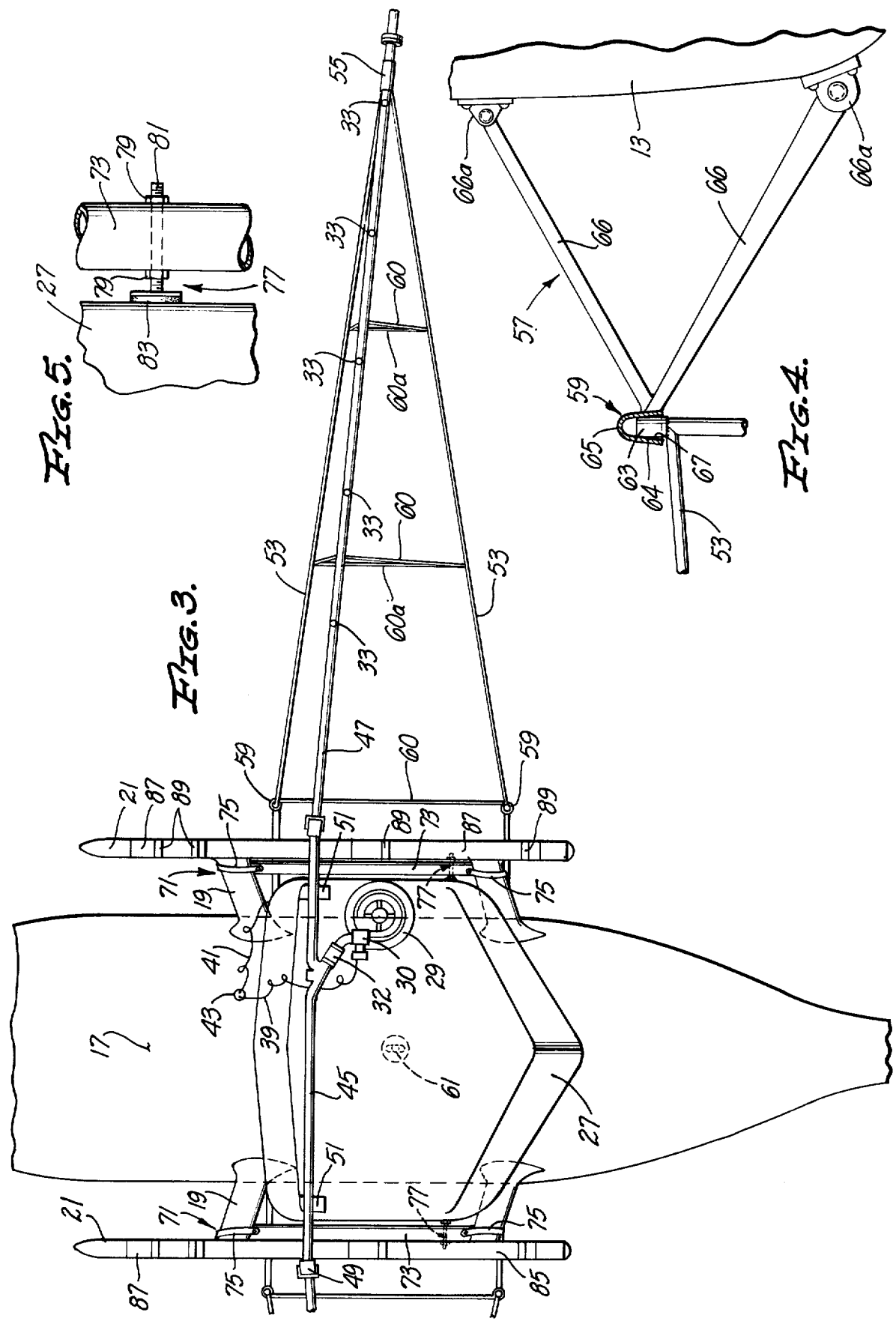

JETTISONABLE AGRICULTURAL SPRAYER

BACKGROUND OF THE INVENTION

1. Field of the Invention

This invention relates generally to spraying apparatus and more specifically to spraying apparatus which can be carried by an aircraft.

2. Description of the Prior Art

In the past various spraying apparatuses have been carried by aircraft, such as helicopters, to spray fluids such as liquid fertilizer or insecticides over a relatively large area of vegetation. These spraying apparatuses have typically included a tank providing a reservoir for the fluid and a spray boom extending laterally of the tank to conduct fluid to the atmosphere. Boom support members have been used to aid in supporting the weight of the spray boom.

In one type of spraying apparatus, the tank is suspended far below the helicopter by a flexible cable which is releasably supported by a hook beneath the helicopter. Because the tank is far below the helicopter, it is difficult for the pilot to accurately determine the position of the tank. In other words, pilot depth perception problems are created. In addition the flexible cable permits the spraying apparatus to swing beneath the helicopter. This, of course, affects not only the stability of the helicopter but also the accuracy with which a given area can be sprayed.

One advantage of considerable importance, however, is that this type of spraying apparatus can be released even while the helicopter is in flight by merely opening the hook. This can be particularly desirable from a safety standpoint if the helicopter becomes endangered. A release capability is also desirable since it permits the helicopter to be flown separately of the spraying apparatus.

In another type of spraying apparatus, the tank is permanently fixed to the helicopter. The spray boom typically extends from the tank and the boom support members extend between the helicopter and the spray boom. This type of spraying apparatus has a fixed relationship with the helicopter when in flight and therefore does not have a particularly adverse affect upon the stability of the helicopter. One disadvantage of this type of spraying apparatus is that only the contents of the tank can be dumped and the spraying apparatus can not be jettisoned. Thus, if the helicopter is "in trouble" the spraying apparatus imposes an undesirable weight penalty. In addition, if the helicopter must make a forced landing, the long, laterally extending booms prevent the helicopter from being landed in a relatively small area.

SUMMARY OF THE INVENTION

In the present invention, the tank, spray boom, and support members have a substantially fixed relationship with the helicopter but are readily releasable to permit flight of the helicopter without the spraying apparatus. The release of the apparatus may be of the quick release or bomb release type so that the apparatus can be jettisoned by the pilot utilizing a suitable control within the aircraft. To prevent the helicopter from interfering with the release of the spraying apparatus, no portion of the helicopter extends into the path of the apparatus as it is dropped from the helicopter. In normal operation, the apparatus is attached to the helicopter by releasable means which may include, for example, a hook or bomb release which engages the tank. The hook is actuable to release the spraying apparatus even in flight. This enhances the safety of the helicopter and also facilitates easy mounting of the spraying apparatus.

To facilitate the obtaining of a substantially fixed relationship between the spraying apparatus and the helicopter and to eliminate the pilot depth problem referred to above, the spraying apparatus may be mounted closely adjacent the helicopter rather than being suspended from the helicopter by a long cable. However, this close relationship between the helicopter and the spraying apparatus must not interfere with release of the latter.

To achieve both of these desirable goals, i.e. a substantially fixed relationship and a release capability, the fluid tank may be releasably connected to the hook on the belly of the helicopter between the landing gear so that it is free to fall from the helicopter. Tank stability is achieved by the proximity of the tank to the belly of the helicopter, the hook, and adjustable stabilizing members.

The spray boom is coupled to the tank and extends generally laterally outwardly from the tank. The landing gear must not interfere with release of the spray boom. Frequently, helicopter landing gear take the form of a pair of skids which normally rest on a supporting surface when the helicopter is not in flight. In this event a plurality of pads may be used to elevate the skids above the supporting surface to provide clearance for the spray boom which extends beneath the skids. A central portion of the spray boom engages lateral portions of this spray boom at first couplings on either side of the helicopter.

The spray boom is supported in a substantially fixed relationship by the first couplings and a pair of boom support members which form a solid triangle with each of the lateral portions of the spray boom and which are connected to the helicopter at second couplings to provide for release of the spray boom. The second couplings permit movement of the boom support members in the downward direction; however, they resist bending loads imposed by the mass of the boom and any fluid therein. The first couplings inhibit movement of the spray boom in the downward direction. When the hook is actuated to release the tank, the first couplings move downwardly with the tank and the boom support members automatically disengage the second couplings so that the tank, spray boom and boom support members are free to fall clear of the helicopter.

These and other features and advantages of the present invention will become more apparent with a discussion of the preferred embodiments described with reference to the associated drawings.

DESCRIPTION OF THE DRAWINGS

FIG. 1 is a side elevational view of one embodiment of the spraying apparatus of this invention mounted on a helicopter;

FIG. 2 is a front elevational view of the helicopter and a portion of the spraying apparatus including a fluid tank and one of a pair of spray booms and associated boom supports which extend laterally of the helicopter;

FIG. 3 is a bottom plan view of the helicopter illustrating a preferred disposition of the tank spray boom with respect to the landing gear of the helicopter;

FIG. 4 is a front elevational view of one embodiment of a coupling which connects the boom supports to the helicopter; and FIG. 5 is a bottom plan view of stabilizing members which engage the tank to inhibit relative movement of the tank and the helicopter.

DESCRIPTION OF PREFERRED EMBODIMENTS

A helicopter is partially illustrated in FIG. 1 and designated by the reference numeral 11. The helicopter 11 includes a fuselage 13 which defines a cockpit 15 and has a belly shown generally at 17. Landing gear supports 19 extend from the fuselage 13 to support landing gear such as the skids 21. When the helicopter 11 is not in flight, the skids 21 support the fuselage 13 at a convenient height above a supporting surface 23.

A spraying apparatus 25 is attached to the helicopter. The spraying apparatus includes a tank 27 or other container which provides a reservoir for the fluid to be sprayed. As best illustrated in FIG. 3, a pump 29 forces the fluid from the tank 27 through a valve 30 and a connection 32 into a spray boom 31. In FIG. 2, a plurality of nozzles 33 provide openings from the spray boom 31 to the atmosphere to spray the fluid over a relatively large area. A gasoline engine 35 can provide a source of power for driving the pump 29. In this embodiment, the tank 27, the engine 35, and the pump 29 have a generally fixed relationship.

The valve 30, which may be a solenoid valve, can be remotely controlled by the pilot from a control console shown schematically at 37 in the cockpit 15. Electrical conductors 39 and 41 extend from the console 37 through a connector 43 to the valve 30 and the engine 25, respectively. The connector 43 is of the type which easily separates with tension on the conductors 39 and 41.

The engine 35 may be started before the helicopter 11 is airborne or a battery operated starter (not shown) may be used to start the engine after the helicopter is in flight. When the helicopter 11 reaches the area to be sprayed, the valve 30 is opened by the pilot utilizing the control console 37.

The spray boom 31 can be any pipe or tube providing a path for the conduction of the fluid laterally of the helicopter 11. In a preferred embodiment, this spray boom 31 has a central portion 45 and a pair of lateral portions 47, which extend laterally from the sides of the helicopter 11. A connector or coupling 49, preferably of the quick disconnect type, provides a fluid connection between the central portion 45 and each of the lateral portions 47.

The central portion 45 of the spray boom 31 can be maintained in a generally fixed relationship with the tank 27 by a pair of mounting brackets 51 attached as by welding to the tank and the central portion 45. It is of particular advantage that the central portion 45 of the boom 31 extends beneath the skids 21.

A pair of boom support members 53 extend from a connector or fitting 55 on each of the lateral portions 47 of the spray boom 31 to the helicopter 11. A connecting apparatus or coupling shown generally at 57 is provided for each of the boom support members 53. Each of the connecting apparatus 57 includes a special connector 59 which releasably couples the associated boom support member to the helicopter. A plurality of ribs 60 interconnect the boom 31 and the boom supports 53. A plurality of ribs 60a interconnect the boom supports 53. The pair of boom support members 53 and the associated lateral portion 47 of the spray boom 31 form the sides of a solid triangle having the connector 55 at the apex of the triangle. This construction provides a rigid structure for supporting the lateral portions 41 of the spray boom 31 against bending loads or loads which tend to pivot the lateral portions about the coupling 49.

When the spraying apparatus 25 is in normal operation, a hook 61 extends from the belly 17 of the fuselage 13 to engage the tank 27 and support the tank, the engine 35, the pump 29 and the central portion 45 of the spray boom 31. Each of the connectors 49 inhibits downward movement of the associated lateral portion 47 of the spray boom 31. As a result, the weight of the lateral portion 47 produces a turning moment about the connector 49. Since the connector 59 inhibits lateral movement of the associated boom support member 53, the connectors 59 tend to oppose the turning moment of the lateral portions 47. The connectors 59 in a preferred embodiment do not support any downward component of force resulting from the weight of the spray boom 31.

Each of the connecting apparatus is identical and a typical one of the connecting apparatus 57 and the associated connector 59 is shown in greater detail in FIG. 4. The connector 59 includes a projection 63 which can be welded to, and extend upwardly from, the boom support member 53. In a preferred embodiment, the projection 63 has an outer surface 64 with a cylindrical configuration. The connector 59 includes a female coupling section 65 having a recess which is supported at a generally fixed point with respect to the fuselage 13 of the helicopter 11. The section 65 is affixed to arms 66 which are attached to the fuselage by yokes or other suitable attaching means 66a, respectively. The female coupling section 65 has an inner surface 67 which engages the outer surface 64 of the projection 63. In a preferred embodiment, to facilitate assembly, the inner surface 67 has a configuration of a cone which increases in diameter in the downward direction. If the surface 64 is provided with a cylindrical or conical configuration and the surface 67 is provided with a conical configuration, the connector 59 will inhibit movement of boom support members 53 in all but the downward direction.

It is of particular advantage that in this embodiment, the only support for the spraying apparatus in the downward direction is provided by the hook 61. This hook 61 is conventional and is of the type commonly found on helicopters. The hook 61 can be opened by the pilot from the cockpit 15 to release the spraying apparatus. The hook 61 not only facilitates the mounting and dismounting of the spraying apparatus 25 but also permits the spraying apparatus 25 to be jettisoned under emergency conditions.

In this particular embodiment, no portion of the spraying apparatus 25 is obstructed by any portion of the helicopter 11, except the hook 61, in the downward direction. In other words, the fuselage 13 and the skids 21 define in part a passageway through which the spraying apparatus 25 is free to fall when the hook 61 is opened. As used herein, the passageway includes any path through which any portion of the spray apparatus 25 passes as it falls free of the helicopter 11 from a position supported by the hook 61. As the tank 27, engine 35, pump 29 and central portion 45 descend through the passageway, downwardly of the belly 17, the connectors 49 also descend. This moves the lateral portions 47 of the spray boom 31 downwardly along with the boom support members 53. As the projections 63 of the connectors 59 are carried downwardly by the boom support members 53, they disengage the coupling section 65 of the connector 59. Thus the opening of the hook 61 also provides for the separation of the spray boom 31 and boom support members 53 from the helicopter 11. The plug 43 associated with the control console 37 separates automatically when the spraying apparatus 25 is disengaged.

To increase the stability of the spraying apparatus 25 when supported by the hook 61, a stabilizing apparatus 71 can extend from the helicopter 11 to the tank 27. In a preferred embodiment, the stabilizing apparatus 71 includes two identical stabilizing bars 73, each of which extends between and registers with an associated pair of the landing gear support members 19 associated with one of the skids 21. The stabilizing bar 73 can be maintained in a substantially fixed relationship with the landing gear support members 19 by a pair of straps 75.

A plurality of stabilizing members 77, one of which is shown in FIG. 5, extend from each of the stabilizing bars 73 a variable distance to contact the surface of the tank 27. In the preferred embodiment, each of the stabilizing members 77 includes two nuts 79 and a bolt 81 which can be screwed through the nuts 79 to support a rubberlike pad 83 a variable distance from the stabilizing bar 73.

It is particularly desirable that the stabilizing members 77 be positioned so that they do not obstruct the passageway associated with the spraying apparatus. Since this passageway extends generally downwardly of the tank 27, the stabilizing members are preferably disposed to contact top and side surfaces only. In a preferred embodiment, the stabilizing members 77 contact the substantially vertical surfaces at the sides of the tank 27. Thus the stabilizing apparatus 71 inhibits movement of the spraying apparatus 25 laterally of the helicopter 11 while permitting downward movement of the spraying apparatus through the passageway. It will be apparent to those skilled in the art that the specific configuration of a stabilizing apparatus will depend primarily upon the configuration of the tank 27.

With the type of helicopter 11 illustrated in FIG. 1, it is generally desirable that the spray boom 31 extend beneath the skids 21. This will enable the spray boom 31 to fall free of the helicopter 11 when the hook 61 is open. This desirable orientation of the spray boom 31 with respect to the skids 21 requires some modification since the skids 21 are designed to normally contact the supporting surface 23 along a pair of lines. Thus, anything extending beneath the skids 21 would necessarily support the weight of the helicopter 11 on the surface 23.

For these reasons, it is generally desirable to provide means for elevating each of the skids 21 a distance sufficient to provide clearance through which the spray boom 31 can extend beneath the skids 21. In a preferred embodiment, a pair of pads 81 are removably maintained in a fixed relationship with each of the skids 21 by a plurality of straps 83. With the clearance provided by the pads 81, the skid 21 and the associated pads 81 define a recess or portion of the passageway through which the spraying apparatus is free to fall. Even though the spray boom 31 extends beneath the skids 21, the pads 81 permit the helicopter 11 to be landed on the supporting surface 23 without placing any weight on the spray boom 31.

The spraying apparatus of the present invention is of particular advantage for use with aircraft such as the helicopter 11. When mounted to the helicopter 11, the spraying apparatus 25 has a substantially fixed relationship with the helicopter 11 and is not free to swing. This increases the stability of the helicopter 11 when in flight and permits greater spraying accuracy. The weight of the spraying apparatus 25 can be supported primarily by the hook 61 which can be opened to permit ejection of the spraying apparatus 25. This is not only desirable from a safety standpoint, but also enhances the ease with which the spraying apparatus 25 can be mounted to the helicopter 11. Special couplings associated with the spray booms 31 also enable these structural members to fall free of the aircraft when the hook 61 is opened.

Although the helicopter 11 and the spraying apparatus 25 have been described with reference to specific embodiments, it will be apparent that the invention can be otherwise embodied so that the scope of the invention should be ascertained only with reference to the following claims.

I claim:
1. A spraying apparatus for spraying a fluid, said spraying apparatus being adapted for connection to an aircraft having a fuselage and a landing gear, said spraying apparatus comprising:
 a tank for containing the fluid to be sprayed;
 first means for releasably coupling the tank to the aircraft with at least a portion of the tank being generally between the landing gear;
 a spray boom having at least one opening through which the fluid can be discharged;
 means for interconnecting the spray boom and the tank with the spray boom projecting laterally outwardly of the tank and with the spray boom being in fluid communication with the tank so that the spray boom can dispense the fluid;
 pump means for pumping the fluid from the tank to the spray boom and through the opening whereby the fluid can be distributed;
 at least one boom support coupled to the spray boom;
 coupling means for releasably attaching the boom support to the aircraft so that the boom support can support the spray boom against forces tending to pivot the boom downwardly; and
 at least said tank and said spray boom being releasable from the aircraft upon the release of said coupling means and said first means.

2. A spraying apparatus as defined in claim 1 including means on said landing gear defining a downwardly opening recess, said spray boom extending laterally from said tank through said recess whereby said landing gear does not interfere with the release of the spray boom.

3. The spraying apparatus recited in claim 1 including means extending from the aircraft toward the tank for stabilizing the tank with respect to the aircraft.

4. A spraying apparatus for spraying a fluid and adapted to be connected to an aircraft having a fuselage and first and second laterally spaced landing gear members, said spraying apparatus comprising:
 a tank for containing the fluid to be sprayed;
 means for releasably coupling the tank to the aircraft with the tank lying generally between the landing gear members and closely adjacent to the fuselage;

a spray boom having at least one opening through which the fluid can be discharged;

means for interconnecting the spray boom and the tank so that the spray boom can receive the fluid from the tank;

pump means for pumping the fluid from the tank to the spray boom and through the opening thereof whereby such fluid can be distributed;

means on at least one of said landing gear members for defining a downwardly opening recess; and said boom extending laterally from said tank toward said one landing gear member and through said recess whereby upon release of the releasable means the spray boom and the tank can be released from the aircraft without interference from said one landing gear member.

5. A spraying apparatus for spraying a fluid, said spraying apparatus being adapted for connection to an aircraft having a fuselage and a landing gear, said spraying apparatus comprising:

a tank for containing the fluid to be sprayed;

first means operable when the aircraft is in flight for releasably coupling the tank to the aircraft with the tank being adjacent and beneath the fuselage;

a spray boom having at least one opening through which the fluid can be discharged;

means for interconnecting the spray boom and the tank with the spray boom projecting laterally outwardly of the tank along a path having a horizontal component and with said spray boom being in fluid communication with the tank so that said spray boom can dispense the fluid;

at least one boom support coupled to the spray boom;

coupling means other than said first means for releasably attaching the boom support to the aircraft so that the boom support an at least assist in supporting the spray boom, said coupling means being releasable with the aircraft in flight; and at least said tank and said spray boom being releasable from the aircraft upon the release of said coupling means and said first means.

6. A spraying apparatus as defined in claim 5 wherein said boom support includes an elongated boom support member attached to said boom at a location remote from said tank and to said coupling means, said coupling means being inboard of said location.

7. A spraying apparatus for spraying a fluid, said spraying apparatus being adapted for connection to an aircraft having a fuselage and a landing gear, said spraying apparatus comprising:

a tank for containing the fluid to be sprayed;

first means operable by the pilot of the aircraft from the cockpit of the aircraft for releasably coupling the tank to the aircraft;

a spray boom having at least one opening through which the fluid can be discharged;

means for interconnecting the spray boom and the tank so that the spray boom can receive the fluid from the tank, said spray boom projecting outwardly of the tank along a path having a horizontal component;

at least one boom support coupled to the spray boom;

coupling means automatically releasable upon the release of said first means for releasably attaching the boom support to the aircraft so that the boom support assists in supporting the spray boom; and at least said tank and said spray boom being releasable from the aircraft upon the release of said first means and said coupling means.

8. A spraying apparatus as defined in claim 7 wherein said boom support includes an elongated boom support member attached to said boom at a location remote from said tank and to said coupling means, said coupling means being inboard of said location, said coupling means includes a projection coupled to one of said aircraft and said boom support member and means defining a recess, said recess defining means being coupled to the other of said coupling means and said aircraft, said projection being receivable within said recess and being freely withdrawable therefrom in a generally vertical direction.

9. A spraying apparatus for spraying a fluid, said spraying apparatus being adapted for connection to an aircraft having a fuselage and and a landing gear, said spraying apparatus comprising:

a tank for containing the fluid to be sprayed;

first means for releasably coupling the tank to the aircraft with at least a portion of the tank being generally between the landing gear;

a spray boom having at least one opening through which the fluid can be discharged;

means for interconnecting the spray boom and the tank so that the spray boom can receive the fluid from the tank, said spray boom projecting outwardly of the tank;

pump means for pumping the fluid from the tank to the spray boom and through the opening whereby the fluid can be distributed;

at least one boom support coupled to the spray boom;

coupling means for releasably attaching the boom support to the aircraft so that the boom support can support the spray boom against forces tending to pivot the boom downwardly;

at least said tank and said spray boom being releasable from the aircraft upon the release of said coupling means and said first means; and said coupling means including means for resisting movement of the boom support generally laterally away from the aircraft and means for permitting downward movement of the boom support at all times.

10. A spraying apparatus as defined in claim 9 wherein said coupling means includes a projection coupled to one of said aircraft and said boom support and means defining a recess, said recess defining means being coupled to the other of said coupling means and said aircraft, said projection being receivable within said recess and being freely withdrawable therefrom in a generally vertical direction.

* * * * *